United States Patent
Kovacs et al.

(10) Patent No.: US 8,652,556 B1
(45) Date of Patent: Feb. 18, 2014

(54) COOKING METHOD AND COOKER FOR COOKING FOODSTUFFS IN STACKABLE TRAYS

(71) Applicant: Laitram, L.L.C., Harahan, LA (US)

(72) Inventors: Joseph F. Kovacs, New Orleans, LA (US); Brent A. Ledet, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/628,192

(22) Filed: Sep. 27, 2012

(51) Int. Cl.
*A47J 37/00* (2006.01)

(52) U.S. Cl.
USPC .............. 426/523; 99/443 C; 99/450; 99/474; 99/477

(58) Field of Classification Search
USPC .............. 426/643, 523; 99/443, 450, 473–481
See application file for complete search history.

(56) References Cited

U.S. PATENT DOCUMENTS

| | | | | |
|---|---|---|---|---|
| 1,772,699 A | * | 8/1930 | Baumann | 99/450 |
| 2,897,746 A | * | 8/1959 | Hilgers | 99/443 R |
| 3,494,305 A | * | 2/1970 | Pachyn | 432/146 |
| 3,540,369 A | | 11/1970 | Brooks | |
| 3,627,393 A | * | 12/1971 | Hickson et al. | 312/31.1 |
| 3,666,481 A | * | 5/1972 | Albright | 426/523 |
| 4,132,216 A | * | 1/1979 | Guibert | 126/261 |
| 4,191,881 A | * | 3/1980 | Ahlgren et al. | 219/388 |
| 4,338,911 A | * | 7/1982 | Smith | 126/21 A |
| 4,367,243 A | * | 1/1983 | Brummett et al. | 426/303 |
| 4,380,127 A | * | 4/1983 | Roberts | 34/197 |
| 4,603,052 A | * | 7/1986 | El-Hag et al. | 426/523 |
| 4,726,766 A | * | 2/1988 | Stewart et al. | 432/133 |
| 4,749,581 A | * | 6/1988 | Gorsuch et al. | 426/505 |
| 4,759,451 A | | 7/1988 | Apps | |
| 4,966,072 A | * | 10/1990 | Ellis-Brown | 99/443 C |
| 5,228,385 A | * | 7/1993 | Friedrich et al. | 99/352 |
| 5,232,609 A | * | 8/1993 | Badinier et al. | 249/102 |
| 5,301,604 A | * | 4/1994 | Takahashi | 99/407 |
| 5,320,210 A | * | 6/1994 | Van Den Bergh et al. | 198/465.1 |
| 5,335,590 A | * | 8/1994 | Crump et al. | 99/479 |
| 5,454,295 A | * | 10/1995 | Cox et al. | 99/332 |
| 5,582,296 A | | 12/1996 | Beauchamp et al. | |
| 5,896,992 A | * | 4/1999 | McGrath | 206/507 |
| 5,970,856 A | * | 10/1999 | Fabrikant et al. | 99/426 |
| 6,054,697 A | * | 4/2000 | Woodward et al. | 219/729 |
| 6,371,012 B2 | * | 4/2002 | Sawyer | 99/450 |
| D488,027 S | | 4/2004 | Lin | |
| 6,883,513 B2 | * | 4/2005 | Bock | 126/1 R |
| 7,069,841 B2 | | 7/2006 | Ledet et al. | |
| 2002/0023548 A1 | * | 2/2002 | Almeida | 99/450 |

OTHER PUBLICATIONS

Laitram Machinery, Inc., "Model FC Cooker," sales brochure, 2007, Laitram Machinery, Inc., Harahan, Louisiana, U.S.A.

* cited by examiner

*Primary Examiner* — Drew E Becker
(74) *Attorney, Agent, or Firm* — James T. Cronvich

(57) ABSTRACT

A cooking system and a method for cooking food products. The cooking system comprises a forced-convection cooker having a conveyor continuously conveying stacks of product-laden trays through a cooking chamber. Fans in the cooking chamber establish a generally vertical convection path traversed by the conveyor. Foraminous bottoms in the trays allow cooking fluid in the convection path to be forced through the trays and products.

14 Claims, 6 Drawing Sheets

COOKING METHOD AND COOKER FOR COOKING FOODSTUFFS IN STACKABLE TRAYS

BACKGROUND

The invention relates generally to cookers and cooking methods and more particularly to continuous forced-convection cookers and methods for cooking food products conveyed in trays through a cooking chamber.

Forced-convection steam cookers are used to cook food products, such as shrimp or vegetables, in a continuous cooking process. Uncooked products are deposited on a foraminous conveyor belt and conveyed through a cooking chamber in the cooker. Blowers in the cooker force a cooking fluid, such as steam, through the foraminous conveyor belt and the product being conveyed through the cooking chamber. If the product mat atop the belt is too thick, the product is not thoroughly cooked throughout the depth of the mat. Some cookers use an S-bend in the conveying path to reposition the product midway through the cooking process to improve the probability of achieving thorough cooking. But S-bends require more vertical space and a more complicated sprocket arrangement to form the bend. Sometimes food products are conveyed through cookers in trays for easier handling after cooking. But if the trays are loaded too deeply, the product will not be cooked throughout. So it becomes necessary to carefully limit the amount of product deposited on each tray.

Thus, there is a need for a cooking system that can thoroughly cook masses of food products in a continuous process.

SUMMARY

A cooking system embodying features of the invention comprises a forced-convection cooker producing a generally vertical convection path of a cooking fluid through a cooking chamber. The conveyor advances through the cooking chamber. Product-laden trays having foraminous bottoms supporting the products are stacked on top of each other in a vertical stack. The stack is conveyed by the conveyor along a conveying path traversing the vertical convection path of the cooking fluid, which is directed through the vertical stack of trays with foraminous bottoms to cook the food product in all the trays.

In another aspect of the invention, a method for cooking food products comprises: (a) loading food products onto trays having product-supporting foraminous bottoms; (b) stacking loaded trays in a vertical stack; (c) conveying the vertical stack of trays through a cooking chamber; and (d) directing a cooking fluid through the foraminous bottoms of the stacked trays in the cooking chamber to cook the food product being conveyed in the trays through the cooking chamber.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
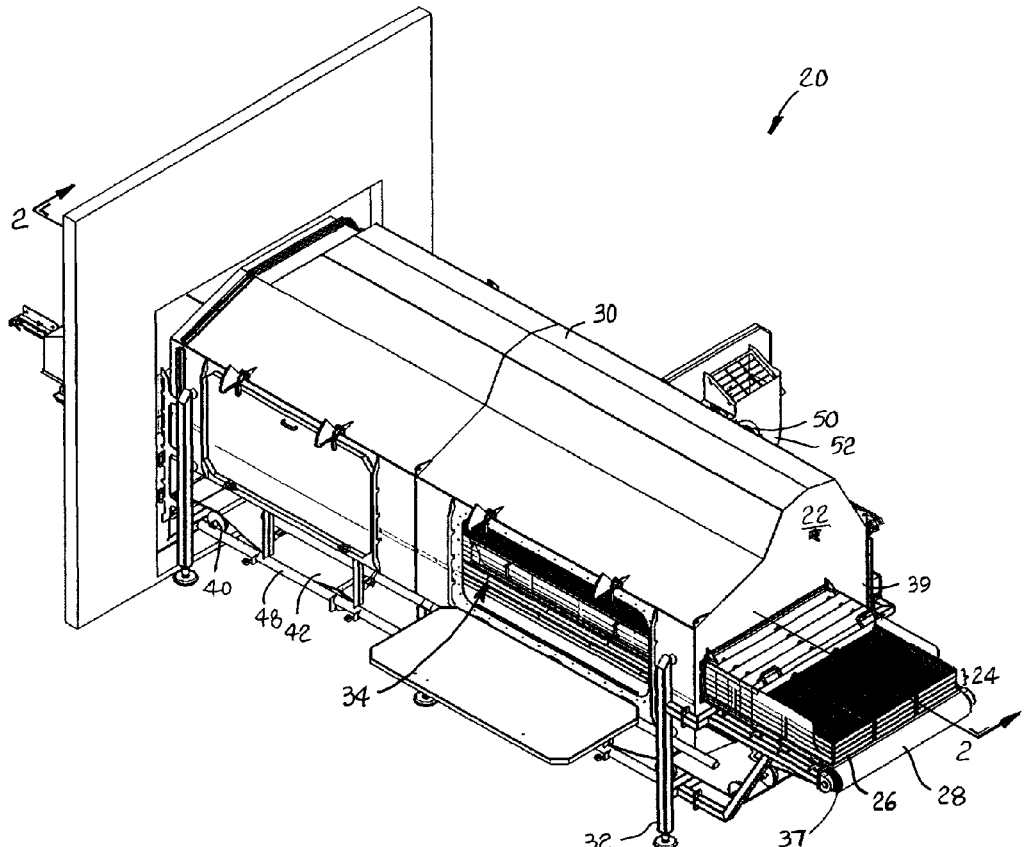
FIG. 1 is an isometric view of a cooking system conveying stacks of product-carrying trays through a forced-convection cooker.
Figure 2:
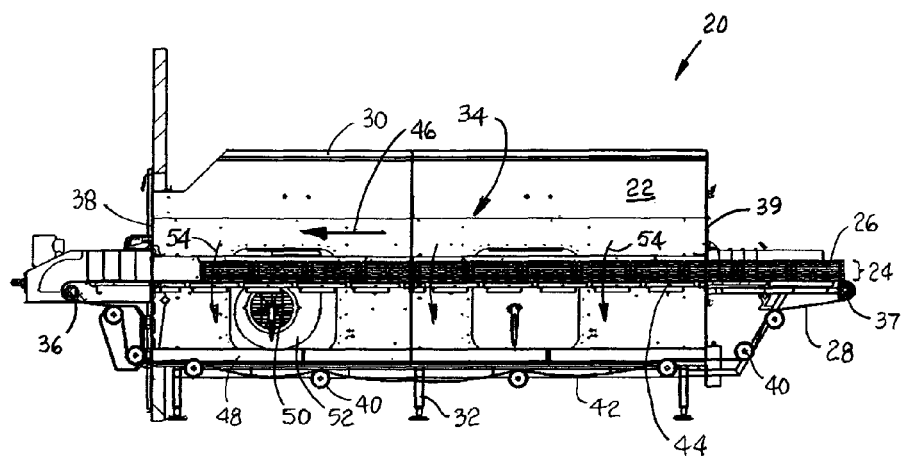
FIG. 2 is a cross section of the cooker of FIG. 1 taken along lines 2-2.

A cooking system that operates according to and embodies features of the invention is shown in FIGS. 1 and 2. The cooking system 20 includes a forced-convection steam cooker 22 through which stacks 24 of product-laden trays 26 are continuously conveyed on a conveyor, such as a foraminous conveyor belt 28. The cooker 22 has an enclosure 30 supported on legs 32 and housing a cooking chamber 34. The conveyor belt 28 is trained around shaft-mounted drive and idle sprockets 36, 37 near exit and entrance ends 38, 39 of the cooker 22. A drive motor (not shown) drives the drive shaft. Diverting rollers or drums 40 guide the endless conveyor belt loop along a returnway 42 below the cooking enclosure. Trays 26 loaded with products to be cooked are stacked atop the conveyor belt 28 at the entrance end 39 of the cooker. Depending on the lateral dimensions of the trays and the width of the belt, one or more stacks 24 can be placed side by side across the width of the belt.

The vertical stacks 24 of trays 26 on the belt 28 are conveyed along an upper carryway 44 through the cooking chamber 34 in a conveying direction 46. A network of pipes 48 injects a cooking fluid, such as steam supplied by a boiler or other steam source, into the cooking chamber 34 through the bottom of the enclosure 30. Air circulators, such as blowers or fans 50, draw air through the side of the enclosure 30. The air is mixed with the cooking fluid injected through the bottom of the enclosure in a plenum 52. The fan blows the air-cooking-fluid mixture into the cooking chamber 34 along a convection path 54 that traverses the carryway 44 generally vertically—in this example, vertically downward. The conveyor belt 22 is foraminous to allow the cooking fluid mixed with air to pass through and also to allow condensate to drain. For the same reason, the bottoms of the trays 26 are also foraminous. The vertical convection path 54 through the conveyor and the stack 24 of trays 26 ensures thorough cooking of the products in all the trays.

Figure 3:
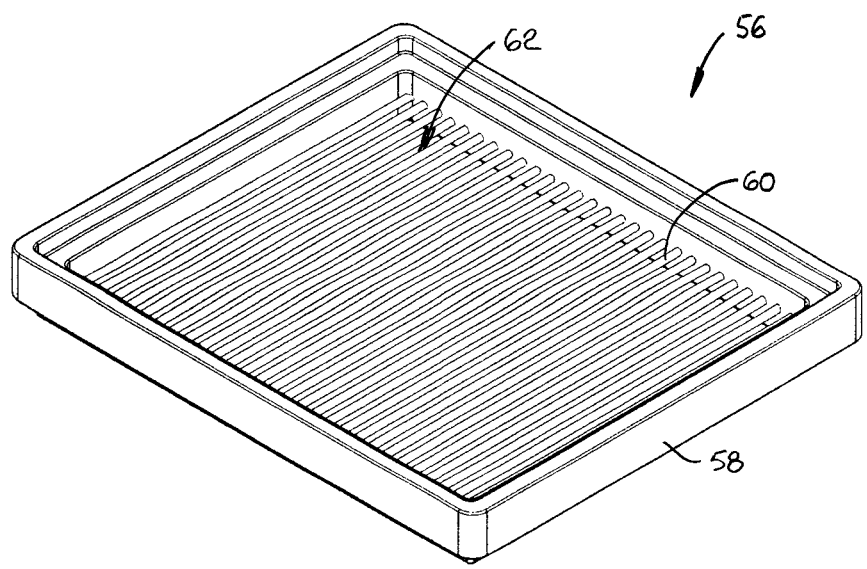
FIG. 3 is an isometric view of a stackable tray with bars usable in a cooking system as in FIG. 1.
Figure 4:
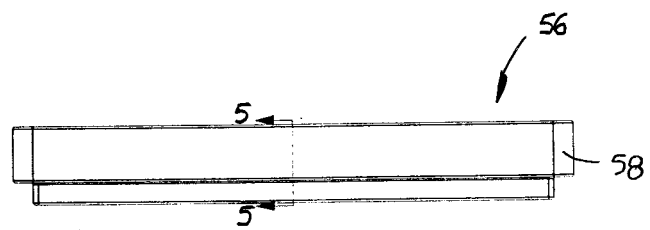
FIG. 4 is an elevation view of the tray of FIG. 3.
Figure 5:
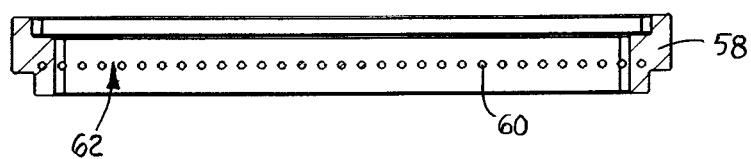
FIG. 5 is a cross section of the tray of FIG. 3 taken along lines 5-5 of FIG. 4.

One version of a tray is shown in FIGS. 3-5. The tray 56 is generally rectangular in shape with an outer frame 58 supporting the ends of a plurality of equi-spaced parallel bars 60 forming a product-supporting bottom of the tray 56. Gaps 62 between the bars 60 make the bottom foraminous and allow the cooking fluid to pass through the product.

Figure 6:
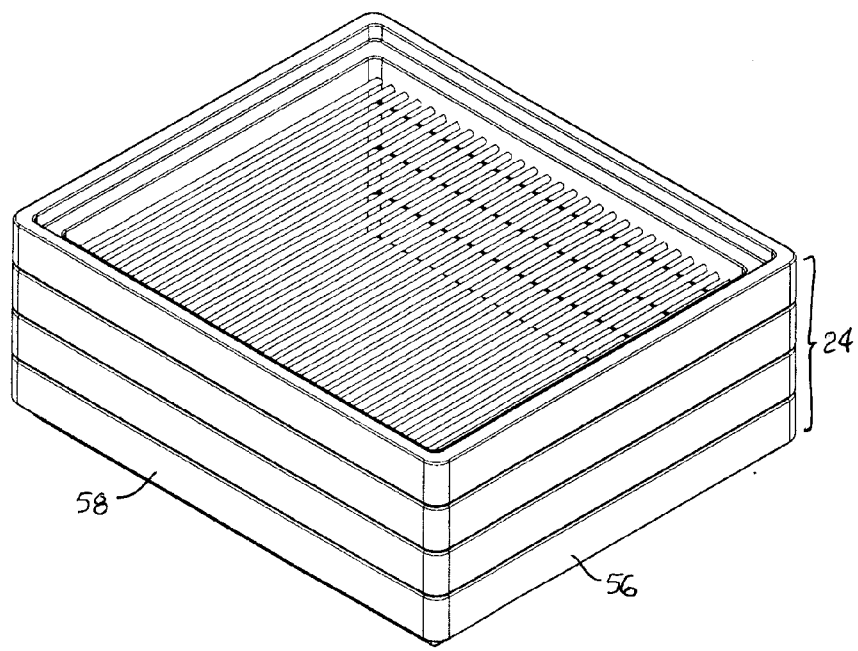
FIG. 6 is an isometric view showing a stack of four of the trays of FIG. 3.
Figure 7:
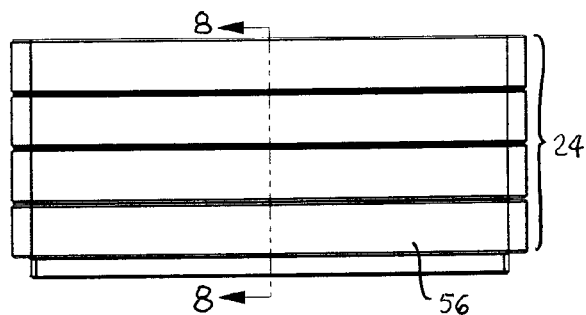
FIG. 7 is an elevation view of the tray stack of FIG. 6.
Figure 8:
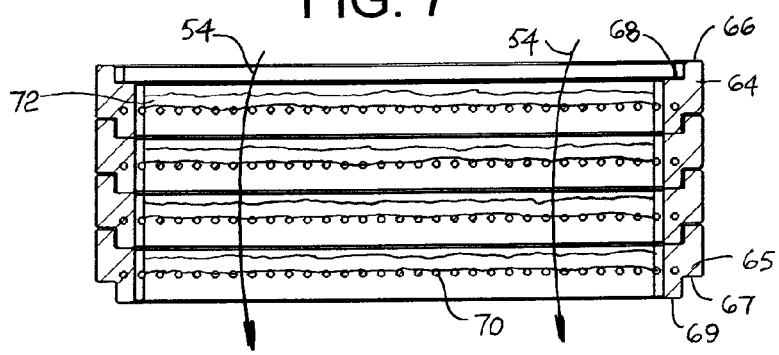
FIG. 8 is a cross section of the tray stack of FIG. 6 taken along lines 8-8 of FIG. 7.

As shown in FIGS. 6-8, the trays 56 can be stacked into a vertical stack 24. The outer frame 58 of each tray has an upper frame portion 64 with a top rim and an upward-facing ledge 68 recessed inward of and below the top rim. The outer frame has a lower frame portion 65 with an undercut face 67 and a bottom edge 69 inward of and below the undercut face. The level of the foraminous product-supporting bottom 70 of the tray 56 is between the bottom edge 69 and the top rim 66. When the trays 56 are stacked, the bottom edge 69 of an upper tray sits on the upward-facing ledge 68 of an immediately lower tray with the undercut face 67 of the upper tray proximate the top rim 66 of the lower tray. Alternatively, the undercut face 67 of the upper tray could sit on the top rim 66 of the lower tray with the bottom edge 69 of the upper tray proximate the upward-facing ledge 68 of the lower tray. Or both complementary pairs of surfaces could be in contact with each other. Generally, each tray has an upper outer frame portion that is shaped and sized to mate with a lower outer frame portion of another tray. Although the upper and lower frame portions 64, 65 in FIG. 8 are portions of a single continuous frame 58 around the periphery of the tray 56, they could be separate pieces not directly connected to each other. As shown in FIG. 8, the convection path 54 extends through products 72 supported on the foraminous bottoms of the trays 56. The stacking of trays allows multiple thinner separated layers of products to be conveyed through a forced-convection cooking chamber, in which the cooking fluid is forced through the layers of products for thorough cooking.

Figure 9:
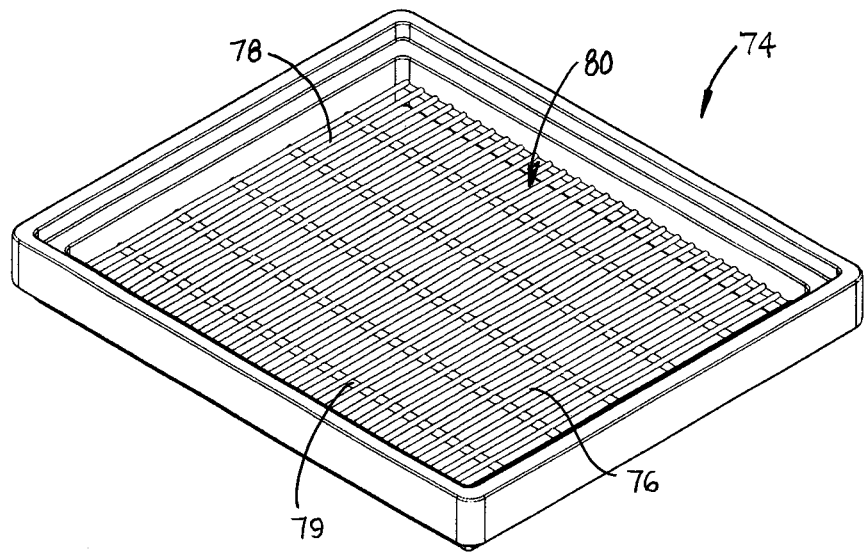
FIG. 9 is an isometric view of another version of a stackable tray having a wire grill and usable in a cooking system as in FIG. 1.
Figure 10:
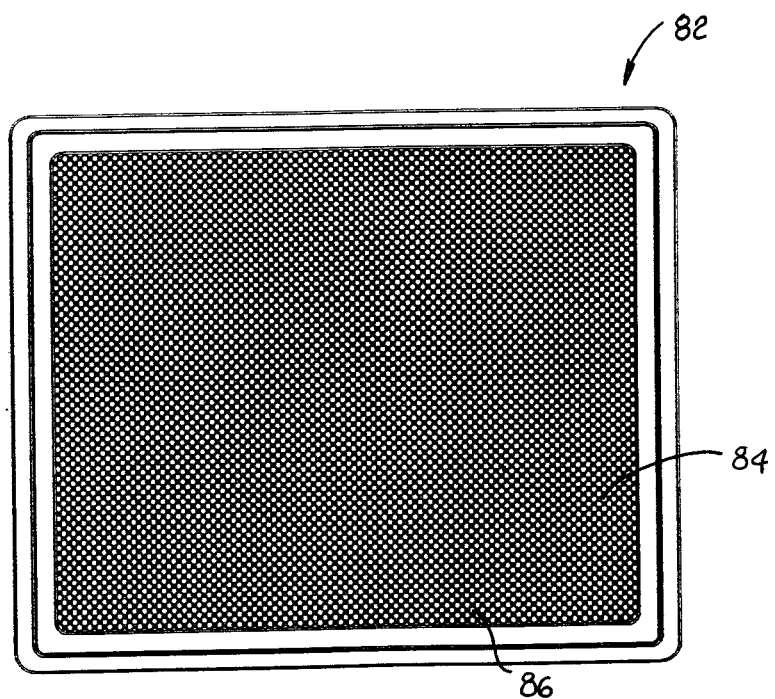
FIG. 10 is a top plan view of a stackable tray having a perforated sheet and usable in a cooking system as in FIG. 1.
Figure 11:
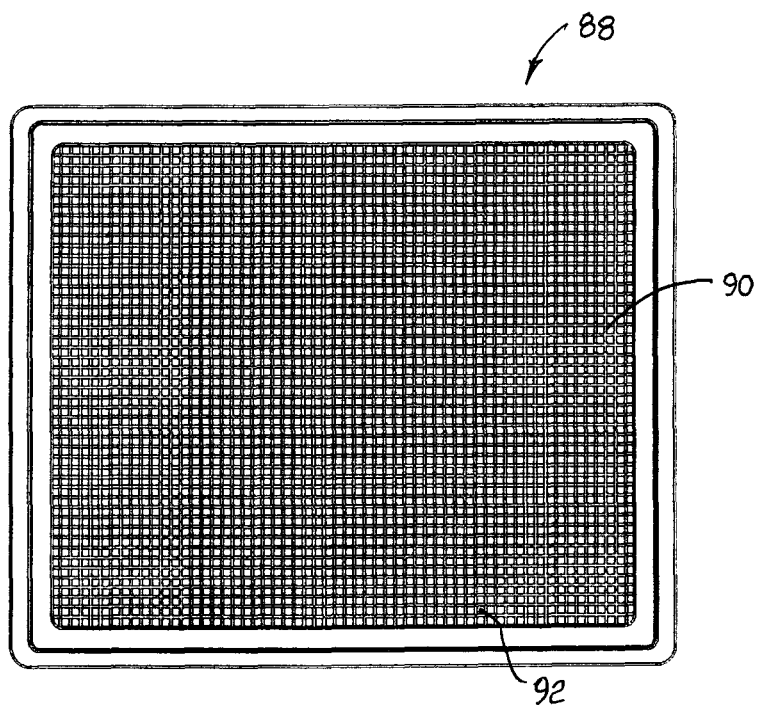
FIG. 11 is a top plan view of a stackable tray having a mesh and usable in a cooking system as in FIG. 1.
Figure 12:
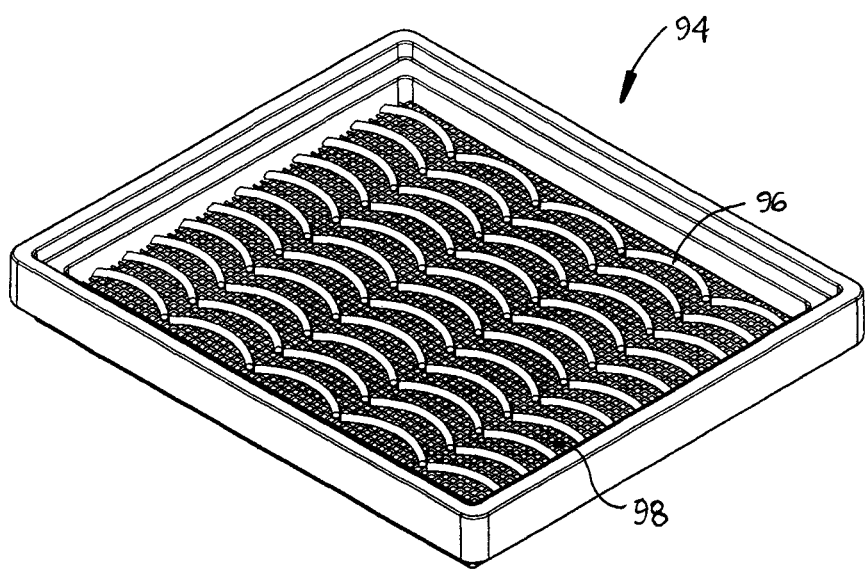
FIG. 12 is an isometric view of a stackable tray with a mesh as in FIG. 11 and further having curved elements for limiting the curl of a product as it cooks.
Figure 13:
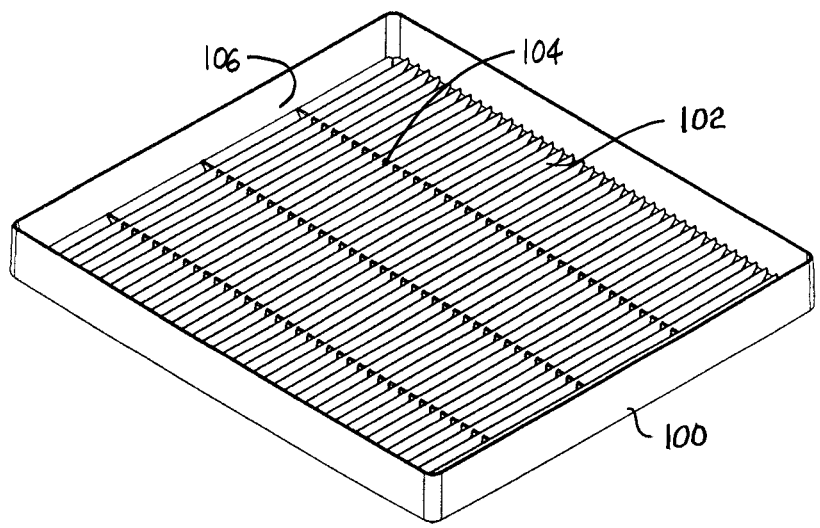
FIG. 13 is an isometric view of another version of a stackable tray having vanes and usable in a cooking system as in FIG. 1.

Other versions of stackable trays are shown in FIGS. 9-13. In FIG. 9, the tray 74 has a foraminous bottom formed by a wire grill 76 of closely spaced, rigid parallel upper wires 78 supported on widely spaced, rigid lower wires 79 perpendicular to the upper wires. Gaps 80 between the wires provide the open area necessary to maintain the convective flow and the narrowness required to prevent products from falling through. The bottom of the tray 82 shown in FIG. 10 is formed by a perforated sheet 84 with many small holes 86. The bottom of the tray 100 shown in FIG. 13 is formed by a plurality of spaced apart, thin, parallel vanes 102 supported on thicker support vanes 104 embedded at opposite ends in the tray's outer frame 106 and perpendicular to the direction of the thin vanes. The thin vanes are arranged on edge for increased open area and minimal contact area with the products. In FIG. 11, the tray 88 has a bottom formed with a screen or mesh 90 forming a grid with openings 92 between the gridlines. In FIG. 12, the tray 94 is identical to the tray 88 in FIG. 11, except that it further includes an array of product-shaping elements 96 upstanding from the product-supporting side of the foraminous bottom 98. Individual products, such as shrimp, which tend to curl when cooled, are positioned between adjacent elements to limit the amount of curl. The product-shaping elements 96 can be used in any of the other tray versions as well and can each be arcuate, piecewise linear, or segmented, for example. In all the trays, the elements forming the bottom may be made of any material, such as plastic for its light weight, low cost, and moldability or metal for its strength and thermal conductivity.

Thus, the cooking system uses a forced-convection cooker and stackable product trays to thoroughly cook products loaded on trays. The loaded trays are stacked atop each other on a conveyor, which conveys the stack of trays through a cooking chamber. The cooker provides a convection path for the cooking fluid. The conveyor traverses the convection path. The foraminous bottoms of the trays allow the cooking fluid directed through the stacks to penetrate the products on each layer of trays for thorough cooking.

What is claimed is:

1. A cooking system comprising:
    a forced-convection cooker having a cooking chamber and producing a generally vertical convection path of a cooking fluid through the cooking chamber;
    a conveyor advancing through the cooking chamber;
    a plurality of product-laden trays having product-supporting foraminous bottoms, wherein the trays are loaded with a food product to be cooked and are stacked on top of each other in a vertical stack conveyed through the cooking chamber by the conveyor along a conveying path traversing the vertical convection path of the cooking fluid directed through the vertical stack of trays to cook the food product in all the trays.

2. A cooking system as in claim 1 wherein the foraminous bottom of each of the trays comprises a plurality of parallel bars spaced apart across gaps.

3. A cooking system as in claim 1 wherein the foraminous bottom of each of the trays comprises a perforated sheet.

4. A cooking system as in claim 1 wherein the foraminous bottom of each of the trays comprises a wire grill.

5. A cooking system as in claim 1 wherein the foraminous bottom of each of the trays comprises a plurality of parallel vanes on edge.

6. A cooking system as in claim 1 wherein the foraminous bottom of each of the trays comprises a mesh.

7. A cooking system as in claim 1 wherein each of the plurality of trays includes a plurality of product-shaping elements upstanding from the product-supporting side of the foraminous bottom to limit the curl of the food product during cooking.

8. A cooking system as in claim 1 wherein each of the plurality of trays includes a peripheral outer frame supporting the foraminous bottom and wherein the peripheral outer frame has an upper portion having inside dimensions and a lower portion having outside dimensions slightly less than the inside dimensions of the upper portion so that the lower portion of an upper tray in a stack of trays tray can be received within the upper portion of an immediately lower tray in the stack.

9. A cooking system as in claim 1 wherein each of the trays further includes:
    an upper outer frame portion having a top rim; and
    a lower outer frame portion below the upper outer frame portion and having an undercut face;
    wherein the undercut face is proximate the top rim of a lower tray when the trays are stacked.

10. A cooking system as in claim 9 wherein:
    the upper outer frame portion has an upward-facing ledge recessed inward of and below the top rim; and
    the lower outer frame portion has a bottom edge inward of and below the undercut face;
    wherein the bottom edge is proximate the upward-facing ledge of a lower tray when the trays are stacked.

11. A cooking system as in claim 9 wherein the upper and lower outer frame portions are portions of a continuous frame forming the periphery of the tray.

12. A cooking system as in claim 1 wherein the conveyor is a foraminous conveyor belt.

13. A method for cooking food products, comprising:
    loading food products onto trays having product-supporting foraminous bottoms;
    stacking loaded trays in a vertical stack;
    conveying the vertical stack of trays through a cooking chamber;
    forcing a cooking fluid through the foraminous bottoms of the stacked trays in the cooking chamber to cook the food products being conveyed in the trays through the cooking chamber.

14. The method of claim 13 comprising conveying multiple vertical stacks of trays side by side through the cooking chamber.

* * * * *